United States Patent [19]
Shutov

[11] Patent Number: 5,769,335
[45] Date of Patent: Jun. 23, 1998

[54] METHOD AND APPARATUS FOR SHEAR PULVERIZATION OF POLYMER MATERIALS

[75] Inventor: Fyodur Shutov, Cookeville, Tenn.

[73] Assignee: Tennessee Technological University, Cookeville, Tenn.

[21] Appl. No.: 791,200

[22] Filed: Jan. 31, 1997

[51] Int. Cl.[6] .................................................... B02C 7/12
[52] U.S. Cl. ......................................... 241/27; 241/261.1
[58] Field of Search .................................. 241/27, 101.2, 241/261.1, 261.2, 280

[56] References Cited

U.S. PATENT DOCUMENTS

| | | | |
|---|---|---|---|
| 3,397,065 | 8/1968 | Cunningham et al. | 99/90 |
| 3,788,567 | 1/1974 | Yamada | 241/247 |
| 3,933,317 | 1/1976 | Rovere | 241/246 |
| 4,008,858 | 2/1977 | Yamada et al. | 241/101.2 |
| 4,249,703 | 2/1981 | Korenev et al. | 241/247 |
| 4,253,613 | 3/1981 | Reinhall | 241/16 |
| 4,607,796 | 8/1986 | Enikolopov et al. | 241/3 |
| 4,607,797 | 8/1986 | Enikolopow et al. | 241/23 |
| 4,986,480 | 1/1991 | Gullichsen et al. | 241/28 |
| 5,195,684 | 3/1993 | Radzins | 241/57 |
| 5,395,055 | 3/1995 | Shutov et al. | 241/16 |
| 5,415,354 | 5/1995 | Shutov et al. | 241/16 |

FOREIGN PATENT DOCUMENTS 0596835  5/1994  European Pat. Off. .

OTHER PUBLICATIONS

Recycling of Materials by the Method of Elastic–Deformation Pulverization.
Polymer Powders from Plastics Wasted as Reinforcing Additives for Polymer Additives: New Products, New Markets, New Technology.
"Polurethane Foams Reinforced with Recycled Polyurethane Foam Waste Powder".
"New Principle of Plastic Waste Recycling: Solid State Shear Extrusion".
"Recycling of Plastics Wastes Using Solid State Shear Extrusion".
Solid State Shear Extrusion (SSSE) for Pulverization of Flexible and Rigid Polyurethane Foam Wastes.

Primary Examiner—John M. Husar
Attorney, Agent, or Firm—Waddey & Patterson; Mark J. Patterson

[57] ABSTRACT

A machine and method for pulverizing solid polymer materials into smaller particles uses a pulverizer head having a rotor with a conical contact surface and a stationary dish with a corresponding inverted conical contact surface. The dish and rotor are axially aligned and spaced apart to define a gap of fixed width between them. The material is conveyed into the gap at 0 PSI from a screw extruder. Rotation of the rotor generates shear forces within the gap that pulverizes the material, with the pulverized particles leaving the pulverizer head at the outer margin of the gap.

16 Claims, 5 Drawing Sheets

PARTICLE SIZE DISTRIBUTION FOR THE POWDER
FROM FLEXIBLE POLYURETHANE FOAM

*FIG. 4*

PARTICLE SIZE DISTRIBUTION FOR THE POWDER
FROM LOW DENSITY POLETHYLENE
(FLOW WITH AND WITHOUT VACUUM ASSISTED)

FIG. 5

METHOD AND APPARATUS FOR SHEAR PULVERIZATION OF POLYMER MATERIALS

BACKGROUND OF THE INVENTION

The present invention relates generally to methods and machines used to pulverize solid polymer materials into particles of reduced size. More particularly, this invention pertains to polymer size reduction using shear pulverization.

Size reduction of a material involves the breakdown of a solid into smaller particles without changing the properties of the material (other than geometrical). It is a physical process in which the linkage forces within the material are broken by means of mechanically induced stresses. It is typically energy intensive, with most of the energy expended being lost as heat.

Size reduction is carried out for many reasons:

Preparing a material for subsequent chemical processes (e.g., to increase surface area);

Preparing a raw material for subsequent separation (e.g., refining an ore);

Producing a specific particle type for a product (e.g., a filler, paint additive, or coating); and Fixing a waste product for recycling (e.g., separating metal and plastic waste).

Examples of size reduced particles are: crushed rock for road paving; flour ground from grain; powdered metal components; fluorescent powder in CRT's; chocolate powder; detergents; pesticides; pigment for coloring paint and cosmetics; various powder coating applications (electrostatic, flame, dispersion, etc.); and molding applications.

In order for size reduction to occur, the internal cohesion of a solid must be destroyed by external forces. There are six types of stresses that can be applied to a solid to cause disintegration. They are:

1. Stressing between two solid surfaces;
2. Stressing both between two surfaces and against adjacent solids;
3. Stressing by impact against a solid surface;
4. Stressing by the impact of particles against one another;
5. Stressing by cutting; and
6. Stressing by the surrounding medium.

There are non-mechanical methods of stress application as well, with plasma reaction and high frequency waves being examples. However, neither process is fully developed.

Size reduction machines can be classified according to their stressing mechanisms. Crushers and roll mills are employed typically for coarse and medium-coarse production. They mainly use stressing mechanisms between two solid surfaces such that medium-hard to hard materials can be broken down. An exception to the coarse production is the high compression roller mill that is capable of producing fine powder.

Impact and jet mills are used for medium-fine to ultra-fine pulverization. They primarily employ stressing against a solid surface, the particles being broken up by the force of impact against a solid surface in the case of mechanical impact mills, or by mutual impact of the particles in the case of jet mills.

Ball, rod, and related mills employ a combination of stressing mechanisms. Particles experience virtually all types of impact and surface stressing. The grinding media can be anything from balls, short cylinders, rods, or even pieces of the material itself, and they are accelerated within a more or less enclosed chamber. The acceleration is effected by either rotational, epicyclic, shaking, or vibrational motion of the chamber. These mills are employed for the very fine to ultrafine size reduction and may be operated wet or dry.

Machines using the three other forms of mechanical stresses are grouped together under miscellaneous size reduction. Cutting is typically used for the size reduction of soft materials such as plastics, vegetables, and animal products. Some materials with poor stability can be reduced in a surrounding medium such as gas streams or by the shearing forces present at their surfaces (i.e. they are their own surrounding medium). An example of non-mechanical energy pulverization is the production of metallic powders from melts through the use of water, gas, or steam atomization.

In contrast to most types of dry processing, in wet processing, the medium surrounding the material to be reduced plays a much more important part. There are numerous factors favoring wet processing, namely, the end product is required as a suspension for downstream processing, the fineness achievable with dry processing is not sufficient, the feed material is a suspension, dust emission must be prevented at all costs, or a chemical or physical reaction of the product surfaces has to be achieved by means of the liquid. A significant drawback to wet processing is that wear in the wet size reduction machine is 3 to 5 times greater as compared to a dry process machine. This also results in a higher product contamination, in view of the higher wear. On the other hand, energy requirements are approximately 30 percent less for wet processing, assuming that the product does not have to be dried.

In the field of size reduction of particles, there are four basic particle parameters of concern—size, shape, density, and surface. These can be split into more specific parameters pertaining both to the single particle or to the bulk group of particles (See Table 1).

TABLE 1

Single particle and bulk powder parameters.

| Single Particle Parameters | Bulk Powder Parameters |
| --- | --- |
| Size | Size Distribution |
| Shape | Surface Area |
| Surface | Bulk Density |
| Density | Cohesion and Adhesion |
| Refractive Index | Surface Charge and Energy |
| Hardness | Porosity |
| Melting Point | Moisture Content |
| Hygroscopiscity | Conductivity |
| Light Scattering | Shear Strength |
| Light Adsorption | Opacity |

Polymeric powders have a multitude of uses in the industrial world. Thermoplastic polymer powders are typically used in coating and molding applications. Recycled thermosetting polymer powders are often used as additives in a re-blend of the same material or as fillers. There are numerous challenges in the creation of a polymeric powder. The primary issue is that polymers are inherently tough and do not pulverize in the same sense as more brittle materials do.

As of 1964, there were three methods of manufacturing polymer powders. The first was precipitation, this being a chemical process. For example, in the case of high density polyethylene (HDPE), the Ziegler process conveniently provides a fine powder directly from the polymerization reaction. Unfortunately, this is not feasible with low density polyethylene (LDPE). The second method was grinding, with the Branbury mixer as an example. When operated at low temperatures, with the addition of water to the resin to prevent heat buildup, the mixer will produce reasonably fine powder. The Branbury powder, however, generally contains a high proportion of long thin particles, which give it a fluffy, poor flowing consistency. The third method was attrition milling, with a conical mill being an example. Two serrated cones, one fitting inside the other, are spun on a common axis, but in opposite directions. A large volume of air is also blown through the mill during operation, and water cooling is provided for the case. The powder created consists in great part of round or nearly round particles of medium-fine size.

Published information on more recent polymer pulverization methods is scarce. Existing commercial pulverizers are not capable of producing highly disperse polymer powders with average particle size distributions below 500 microns. Finer powders may be made by any technique that increases the fragility of the polymer resin, for instance by nitrogen cooling (cryogrinding) or soaking in alcohol before grinding. This approach obviously comes at an added expense and it would be exorbitant for cryogrinding.

A particular application where an improved pulverization process is needed is in the recycling of flexible and rigid polyurethane foam (PUF). In the United States, around 2,000 million pounds of flexible PUF are consumed each year by the automotive, furniture, bedding, and carpet underlaying industries. It should be expected that roughly 1,500 million pounds of post-consumer PUDF had been discarded in 1995 as products wear out or are salvaged. In North America approximately 400 million pounds of flexible PUF scrap are disposed of each year from automobile seats. This scrap is currently being used for re-bond, carpet underlay, pillow fill, or is disposed via landfill. Only a small fraction (10 percent) of the total post-consumer PUF waste is estimated to find a market via various recycling processes. However, the polyurethane industry recognizes that recycling efforts need to be extended beyond this in order to obtain the optimum economic benefit from the PUF scrap.

Research by the polyurethane industry has shown that there is a range of technological options for managing polyurethane wastes in addition to the current practice of landfilling. Energy recovery, chemical recycling and physical recycling have their place in the developing waste management market and the balance between technologies will depend on several technical factors, including:

The volumes, quantities, and consistency of polyurethane waste streams;

The economic viability of the technology, especially the potential to develop new markets for recycled products, or the cost difference between recycled and existing products;

The infrastructure for collecting the processing the waste streams; and

The environmental impact of technology.

Analysis of the various options for recovering optimum economic benefit from scrap polyurethane has shown that the process of pulverization of the scrap into a fine powder seems to be a promising one. This process can be used with virtually all polyurethane types and increases the value of the scrap appreciably. The foam powder produced finds a number of applications, such as, a filler in various polymer matrices including rigid and flexible PUF.

Today there are several processes for pulverization of plastics based on Bridgmen's Effect. The Bridgmen's Effect phenomena uses simultaneous actions of high pressure and shear deformation between mirror-like metal surfaces. With the application of pressure, shear, and temperature at optimum proportion, the total amount of solid polymer can be successfully converted into material of high dispersity.

The first process based on Bridgmen's Effect for pulverization of virgin polymers was Solid State Shear Extrusion (SSSE). This process was originally developed at the Institution of Chemical Physics of the Academy of Sciences, Moscow, Russia and two patents were issued (U.S. Pat. Nos. 4,607,796 and 4,607,797) for a technique for producing powder from polymer melt.

During 1991–1994, the SSSE process was modified by F. Shutov, G. Ivanov, et al. at the Illinois Institute of Technology (IIT), Chicago, USA. Three patents were issued on this process of "Solid State Shear Extrusion (SSSE) Pulverization" (U.S. Pat. Nos. 5,395,055; 5,397,065; and 5,415,354), dealing with pulverization of thermoplastics, thermosetting (including PUF) and rubber materials, respectively, using non-modular conical twin-screw extrusion. The SSSE process is realized below the melting temperature (or heat distortion temperature) of polymers, i.e., at solid state. Accordingly, the chemical structure and therefore the physical properties of polymers do not change during the SSSE pulverization process.

The primary weakness of all of the prior art processes is low material throughput. What is needed, then, is a method and apparatus for pulverization of polymers from the solid state into a powder which is efficient and low cost.

SUMMARY OF THE INVENTION

The novel shear pulverization process of the present invention uses a special pulverization head and a conventional extruder. The pulverization head consists of a stationary dish that is aligned axially with a rotor. The rotor is machined to have a convex or "male" conical contact surface, with the dish having a conforming concave or "female" inverted conical contact surface. Thus, by moving the rotor axially in relationship to the dish, a gap of predetermined width can be mechanically fixed between the two smooth, non-abrading contact surfaces of the dish and rotor.

The solid material to be pulverized is conveyed into the gap between the dish and rotor through a material input port at the center of the dish. The solid material is conveyed to the input port by a single screw extruder. The rotation of the rotor generates shear forces on the material which leads to pulverization and particle size reduction into a powder. As the powder is created within the gap, it leaves the pulverization head through the gap at the outer marginal edge of the rotor contact surface. The removal of powder can be passive or can be assisted by vacuum or other means, with the objective being maintaining a material pressure level of zero at the material input port. Compared to a prior art SSSE process, the pulverization process of this invention has several novel features.

First, the pulverization process occurs by shear stress generated by rotation of the rotor connected to a gear-box and motor.

Second, the pulverization process takes place in the gap between the dish and rotor. The width of the gap is mechanically fixed but can be varied according to the chemical type of the polymer, and its solid state, density and rigidity as it comes from the extruder, and according to processing parameters such as feed rate, rate of rotation, dish and rotor temperatures, torque, etc., and also according to the particle size of the final powder generated by the pulverizer.

Third, the size, shape and output of the powder are regulated by the combination of processing parameters of the extruder and pulverizer, the gap width, and the configuration of the dish/rotor gap (conical, spherical, flat, etc.).

Using the method of this invention, the pulverization process is realized below the melting points for thermoplastics, as well as for thermosetting resins, both for single plastics or their mixtures, for solid composites and foamed plastics. The process can be used to pulverize a number of plastics, including Low Density Polyethylene (LDPE), as well as flexible polyurethane foams. Each plastic may be pulverized with predetermined average size in a broad range of the particle size distribution (from 70 to 1000 microns) by optimal combination of the processing parameters.

DESCRIPTION OF THE PREFERRED EMBODIMENTS

Figure 1:
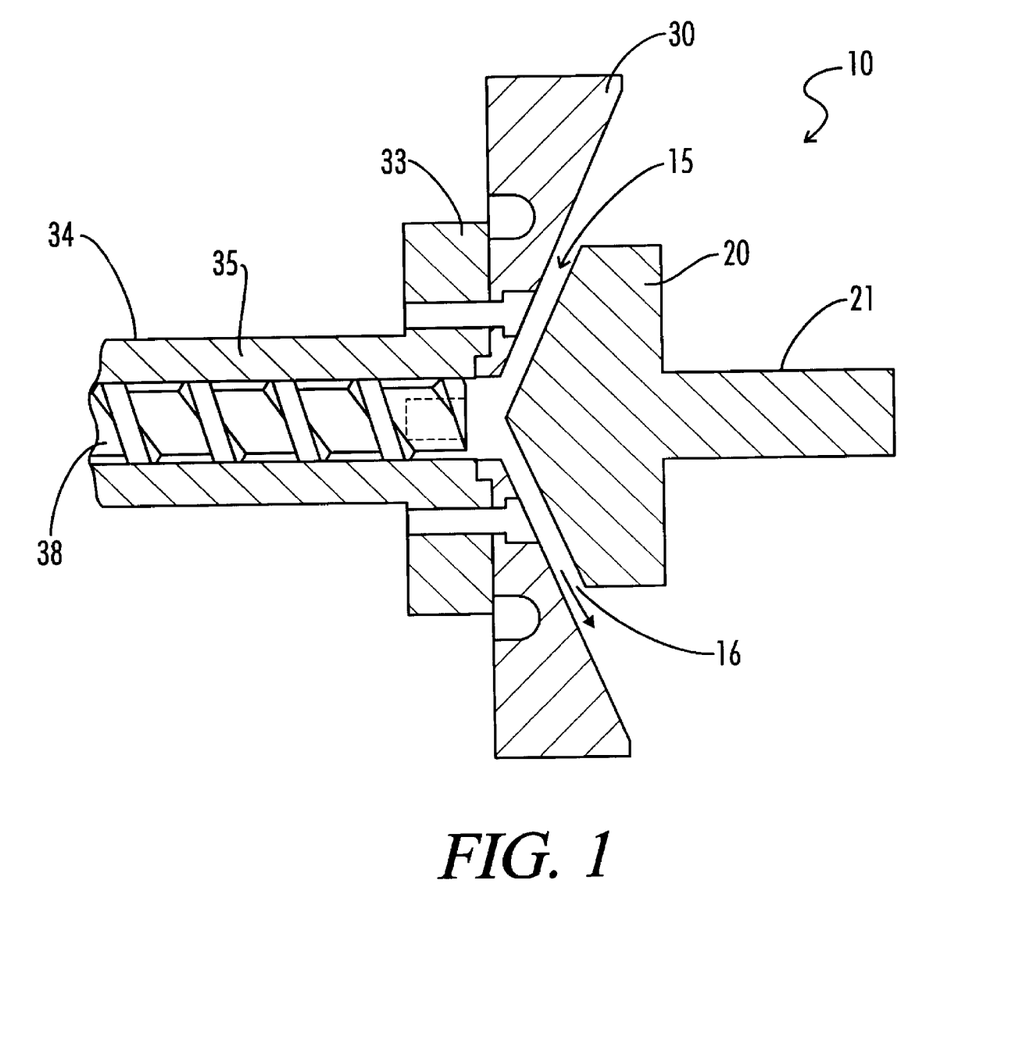
FIG. 1 is a cutaway side view of the pulverization apparatus of this invention used in conjunction with a single screw extruder.
Figure 2:
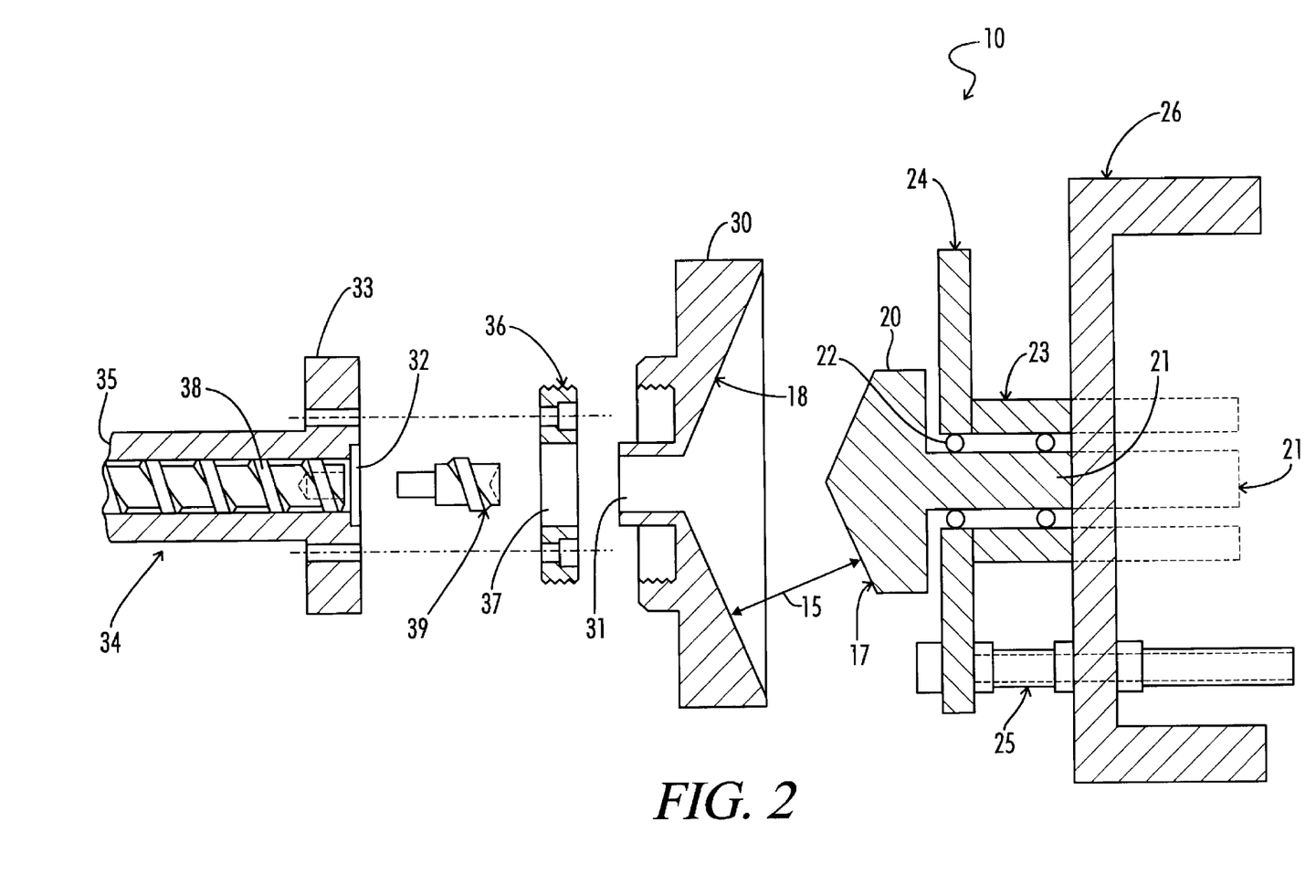
FIG. 2 is an exploded side view of a second embodiment of the pulverization apparatus of FIG. 1 used with a modified extruder screw tip and threaded ring attachment.

A preferred embodiment of the pulverization apparatus 10 of the invention is shown in exploded view in FIG. 2, with an enlarged view of the rotor 20 and dish 30 shown in operating position in FIG. 1. Pulverization actually occurs in a gap 15 defined between the respective contact surfaces 17 and 18 FIG. 2) of the rotor 20 and the dish 30. The rotor 20 is mounted or is formed integral to a shaft 21. The shaft 21, in turn, is mechanically connected to a drive motor (not shown) through a conventional bearing and gear reducer box (not shown). The shaft 21 is supported on bearings 22 within a rotor housing 23 which includes a backing plate 24. The rotor 20 and dish 30 are axially aligned and are spaced apart by a pre determined width which is determined by adjustment screw assembly 25 which is connected between rotor backing plate 24 and a support bracket 26.

The material to be pulverized is delivered to the pulverization apparatus 10 from a conventional screw extruder 34 in which an elongated screw 38 rotates within a barrel 35. Material is fed into a hopper 40 (FIG. 3) located at the input end of the extruder 34. Rotation of the screw 38 moves the material forward toward the extruder output 32 (FIG. 2). Output flange 33 of extruder barrel 35 is bolted to a threaded ring 36 (FIG. 2) which is mounted to the input side of dish 30. A cylindrical opening 37 is machined through the center of ring 36 so that material can move from the output 32 of extruder barrel 35. The extruder 34 shown is a single screw, cylindrical device of conventional design. Other extruders can also be used, including twin screw (co-rotating or counter-rotating) and conical extruders.

Before pulverization begins, rotor 20 is moved axially into a position with respect to stationary dish 30 to define a gap 15 of pre determined width. The solid material to be pulverized is fed into the gap 15 between the dish 30 and rotor 20 through a cylindrical material input port 31 (FIG. 2) which is machined into the center of dish 30. The input port 31 in dish 30 communicates with the output 32 of extruder barrel 35, via opening 37 in ring 36.

The delivery rate of the material preferably will be controlled and adjusted so that the material input pressure at input port 31 is maintained at 0 PSI. Of course, the width of gap 15, the diameter of input port 31, the circumference of the outer margin of rotor contact surface 17, the type of material, the rotating speed of the rotor 20, as well as other parameters, all will have an effect on the material input pressure. It will be apparent from FIG. 1 that as the material is pulverized within gap 15, the resulting powder will be moved by shear forces out of the pulverization head at the outer margin 16 of gap 15. In some applications, passive exhaust of the powder is adequate. In others, active removal of the powder from the gap 15 by vacuum or mechanical assistance will be needed. For example, looking at FIG. 2, a modified tip 39 can be mounted on extruder screw 38 to assist in moving—and preventing the build-up of material—at input port 31. The distal end of modified screw tip 39 extends at least partially into the material input port 31 and, as shown on FIG. 3, can even be extended into a slot 41 formed in the center of the contact surface 17 of rotor 20. Again, the objective is to pulverize the solid material by shear forces generated inside gap 15, not by pressure.

Figure 3:
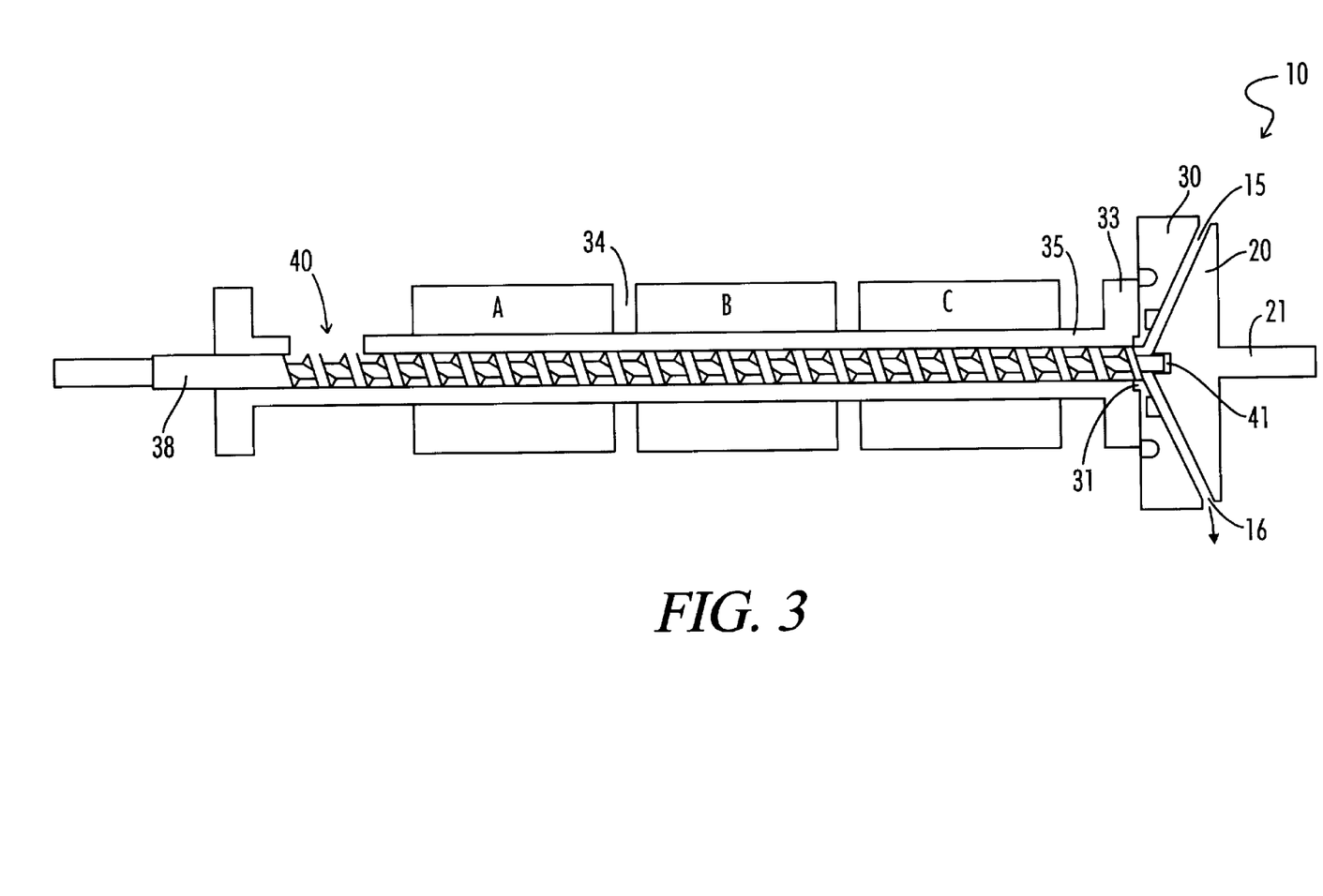
FIG. 3 is a cutaway side view of a typical operational test set-up used in conjunction with the pulverization apparatus of FIG. 1, but with a slot in the rotor to receive the screw tip.

In the preferred embodiments of pulverization apparatus 10 shown in FIGS. 1, 2, and 3, the rotor 20 has a contact surface 17 that is conical in shape, with a cone angle such as 45 degrees. The contact surface 18 of dish 30 is formed into an inverted cone so that surfaces 17 and 18 are conforming, mating surfaces, producing a gap 15 of constant width from the center of rotor 20 to the outer margin 16. The rotor 20 and dish 30 can be made from stainless steel or similar material. The contact surfaces of the dish 30 and rotor 20 should be smooth and non-abrading.

The embodiments of the pulverization apparatus 10 in FIGS. 1, 2, and 3 illustrate the concept and basic mechanical implementation of the invention. However, the scaling-up of the pulverization process, and adaptation to different production environments, is important. It is not practical to establish firm size and functional parameters, or sizing formulas, for each possible application. This must be done by the user with the goal to reach the desired throughput of the system. To increase the throughput of the process, the main components of the apparatus 10 must be evaluated. Parameters considered pertinent to facilitate the selection of components are as follows:

Tangential speed of rotor 20 against the dish 30

Gap between the rotor 20 and the dish 30

Friction between the rotor 20 and the dish 30

As the apparatus 10 can be used in a variety of different environments and at different production levels, scaling the components up or down requires some straightforward tests to evaluate the components for use in the process. A basic test and evaluation set-up for this purpose is shown in FIG. 3. The extruder 34 has three separate heating/cooling zones A, B, and C which control the temperature of the material as it moves through the extruder.

Operation of the Pulverizer Apparatus

Cooling of the rotor 20 may be necessary. This, for the most part, is due to the goal of eliminating pulverization in the extruder barrel 35 (i.e. obtaining full melt conditions) and performing all pulverization between the rotor 20 and dish 30. The material must be cooled suddenly when it enters the gap 15. One technique for cooling is to use a hollow shaft 21 to feed and return a cooling liquid to the inside of the rotor 20. Sealed jackets at the inlet and outlet would allow for shaft rotation. Cooling of the dish may also needed, using conventional techniques known to those in the art.

In typical operation, the extruder screw 38 will be rotating at up to 30 RPM, with rotor 20 turning at up to 300 RPM. The width of gap 15 will typically be fixed at between 0.25 and 1.00 mm (0.01–0.04").

Example 1

Pulverization of Polyurethane Foam Scrap

The pulverization process of this invention has several commercial advantages over prior art SSSE processes based on twin-screw machines such as much higher output, more energy saving, more simple and durable design, and much cheaper cost of pulverization machines. Additional benefits of this process over conventional cryogenic grinding pulverization of PUF scrap are the low to no heating of the extruder barrel 35, and it is not necessary to use any cryogen media such a liquid nitrogen.

Using this process, the production of powder from rigid or flexible PUF scrap proceeds as follows. The large pieces of scrap foam are fed into a knife blade granulator, where they are reduced to particles ⅛ to ½ inch. These scrap particles are fed to the hopper 40 of the extruder 34 and the processing parameters of the extruder 34 are set at their predetermined values.

Figure 4:
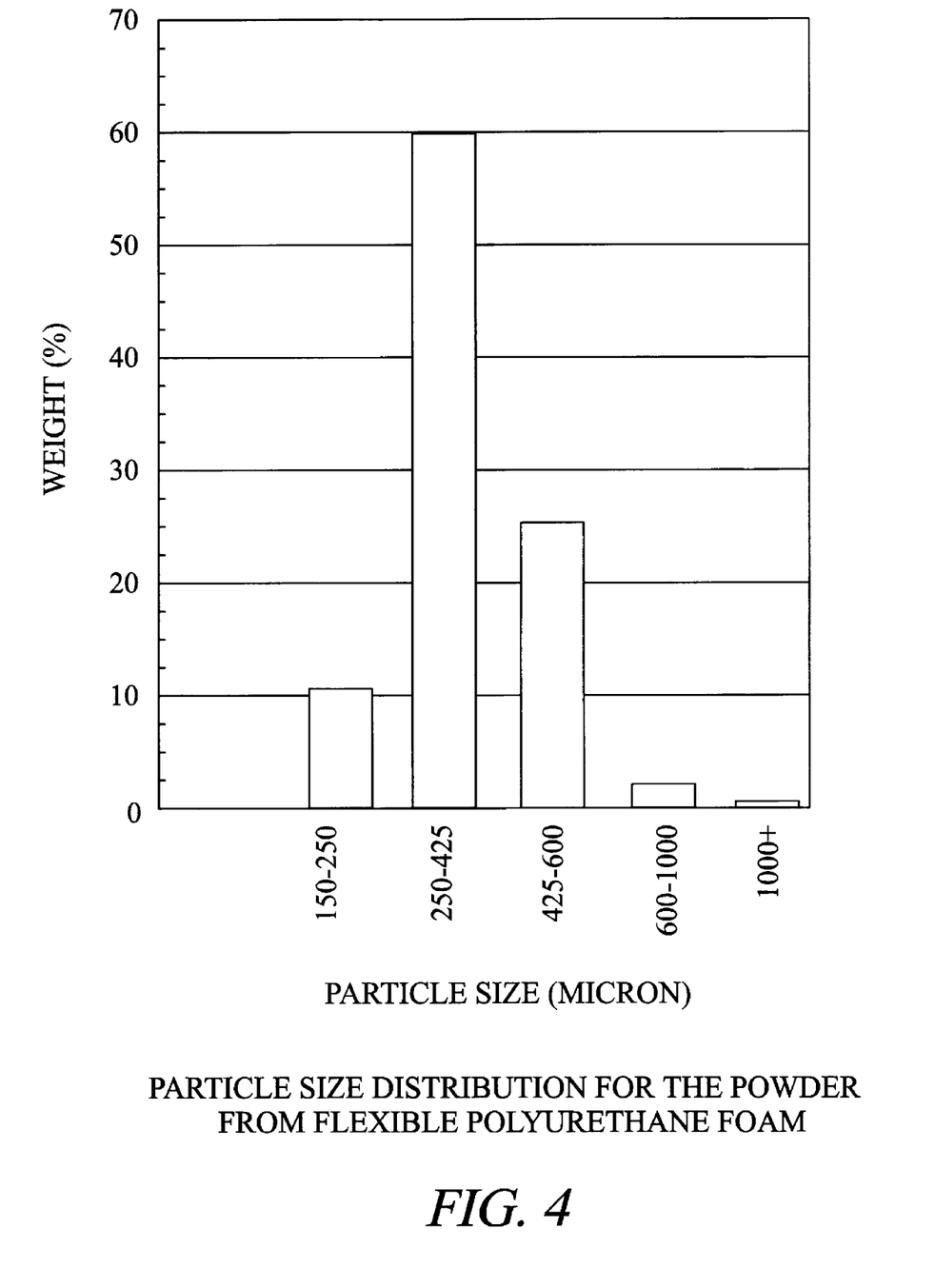
FIG. 4 is a bar graph showing the distribution by weight of particle sizes in a powder generated from flexible polyurethane foam using the method of the present invention.

In this first example of the application of the method of this invention, polyurethane foam scrap was fed into hopper 40 of extruder 34. The temperatures in the heating zones of the extruder barrel 35 were as follows: zone A - 40° C., zone B - 55° C.; zone C - 75° C. The temperature of the dish 30 was 30° C. The gap 15 between the dish 30 and rotor 20 was set at 0.58 mm (0.023"). The speed of the extruder screw 38 was 30 RPM, and the rotor 30 was turning at 300 RPM. The foam material was fed into the pulverizer apparatus 10 at 20 g/min. The typical data from sieve analysis of the powder, as presented in FIG. 4, demonstrates that the powder has a narrow particle size distribution, and the fraction with the size range 250–420 microns constitutes around 75% of the output.

Example 2

Pulverization of Low Density Polyethylene Resin

Figure 5:
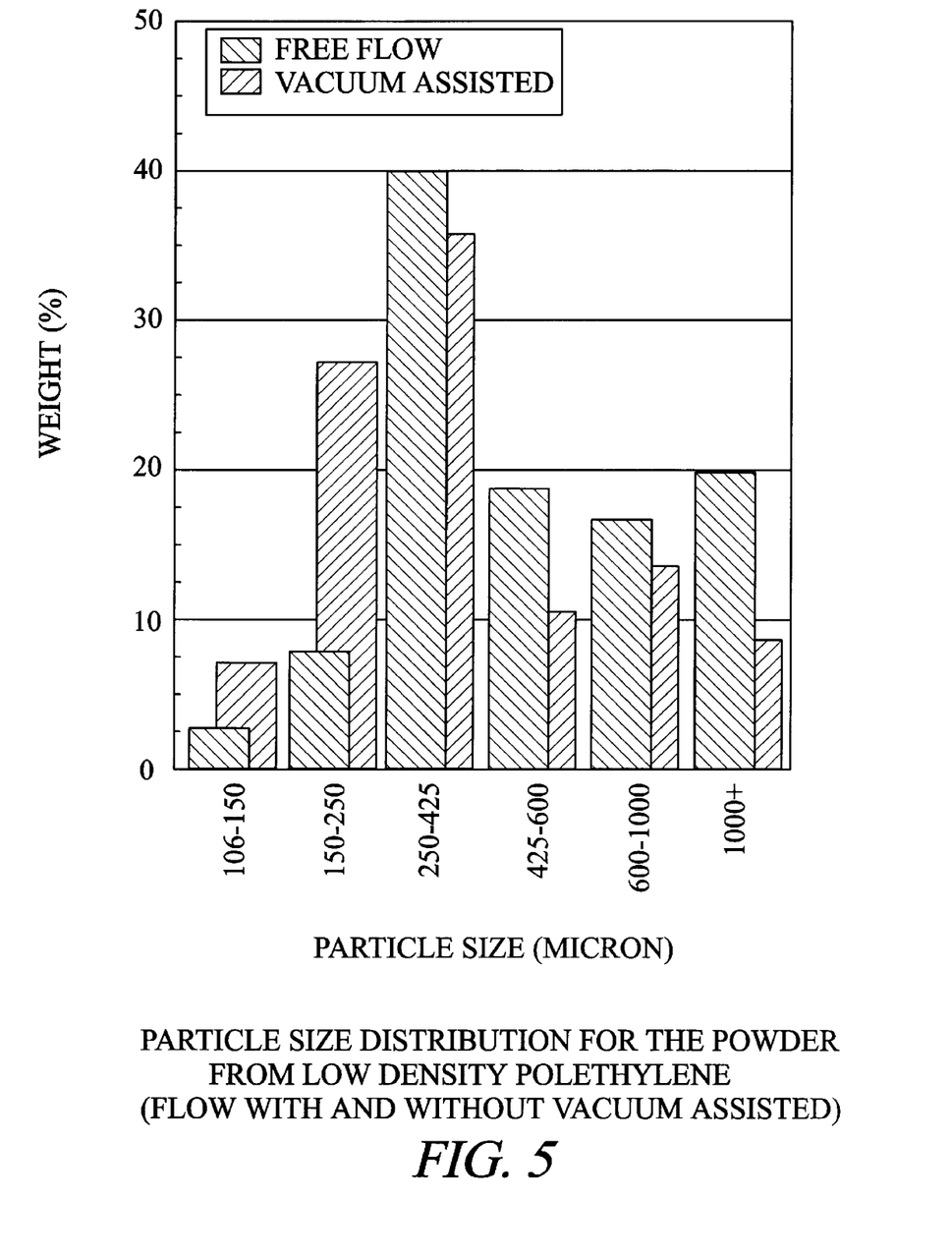
FIG. 5 is a bar graph showing the distribution by weight of particle sizes in a powder generated from Low Density Polyethylene, with and without vacuum assist, using the method of the present invention.

In a second application of the method of this invention, granules or flakes of LDPE resin (melt index 35) were fed to the hopper 40 of the extruder 34 and the processing parameters of the extruder 34 are set at their pre-determined values such as: extruder heating zone A temperature -105° C.; zone B -80° C.; zone C - 60° C.; dish 30 temperature - 50° C. Feed rate was 5.2 g/min; screw 38 speed - 20 RPM; rotor 20 speed - 200 RPM. The gap width 15 between the rotor 20 and dish 30 was 0.05 mm (0.02"). The typical particle size distribution after sieve analysis is presented at FIG. 5. The same figure demonstrates also the results of the same pulverization process using two methods of collection: free flow and vacuum assisted. For both cases the main part of particles have the size range below 425 microns.

The method of this invention can be applied to pulverize virgin polymers, plastic waste, as well as thermoplastic and thermosetting resins.

Thus, although there have been described particular embodiments of the present invention of a new and useful "Method and Apparatus for Shear Pulverization of Polymer Materials", it is not intended that such references be construed as limitations upon the scope of this invention except as set forth in the following claims. Further, although there have been described certain dimensions and operational parameters used in the preferred embodiment it is not intended that such dimensions and parameters be construed as limitations upon the scope of this invention except as set forth in the following claims.

What is claimed is:

1. A machine for pulverizing a solid plastic material comprising:
   a. a rotor having a smooth, non-abrading rotor contact surface;
   b. a dish having a stationary smooth, non-abrading dish contact surface;
   c. the rotor and dish are aligned axially and spaced apart such that the rotor contact surface and the dish contact surface are in opposed positions to define a gap between them of a fixed width, with the gap extending to a circumference defined by an outer margin of the rotor contact surface;
   d. material delivery means to convey the solid material into the gap between the rotor and dish contact surfaces; and
   e. drive means to rotate the rotor at a rate to generate shear forces inside the gap, thereby pulverizing the solid material within the gap into smaller particles, with the particles exiting the gap at the outer margin of the rotor contact surface.

2. The pulverizing machine of claim 1 wherein the material delivery means comprises an extruder having a rotating screw and an extruder output which conveys the solid plastic material to a material input port of predetermined diameter that passes through the dish and into the gap.

3. The pulverizing machine of claim 2 wherein the extruder, the width and circumference of the gap, and the diameter of the material input port, are selected to maintain a material pressure at the material input port close to zero whereby the material in the gas is pulverized by shear forces inside the gap and not by internal pressure or compression forces.

4. The pulverizing machine of claim 3 wherein the rotor contact surface is substantially conical and wherein the dish contact surface includes a substantially inverted conical section which corresponds to and receives the rotor contact surface such that corresponding central portions of the rotor and dish contact surfaces are axially aligned and the gap between the dish and rotor contact surfaces has a substantially constant width extending outward to the outer margin of the rotor contact surface.

5. The pulverizing machine of claim 4 wherein the material input port passes through the center of the dish contact surface such that the material enters the gap at the central portion of the dish contact surface.

6. The pulverizing machine of claim 5 further comprising an extruder screw tip which is attached to the extruder screw and which extends at least partially into the dish material input port.

7. The pulverizing machine of claim 6 wherein the rotor further comprises a shaft which is driven by the drive means and rotates within a rotor housing.

8. The pulverizing machine of claim 7 further comprising means to adjust the width of the gap between the rotor and the dish by varying an axial position of the rotor housing.

9. In a system for pulverizing solid material into smaller particles, the system including a screw extruder which conveys the solid material to an extruder output, and a drive motor, an improved pulverizer head comprising a rotatable rotor and a stationary dish having opposed smooth, non-abrading surfaces that are spaced apart to provide a fixed gap between them, the dish including a material input port that receives the solid material from the extruder output port and delivers the material into the gap, the rotor including a shaft which is mechanically connected to the drive motor, and the gap extending to an outer margin of the rotor contact surface to provide an area where the smaller particles leave the pulverizer head.

10. The pulverizer head of claim 9 wherein the opposed contact sure of the rotor and dish comprise conforming conical and inverted conical shapes that define a gap of constant width from the material input port to the outer margin of the rotor contact sure.

11. The pulverizer head of claim 10 wherein a material input pressure measured at the material input port is maintained at near zero such that the material is pulverized by shear forces generated in the gap and not by compression forces.

12. The pulverizer head of claim 11 further comprising an auxiliary screw tip which extends into the material input port and is attached to a rotating screw component of the extruder.

13. A method of pulverizing solid material into smaller particles comprising the steps of:
   a. conveying the material into a gap of fixed width between opposed conical and inverted conical smooth, non-abrading contact surfaces on a rotor and dish;
   b. generating shear forces in the material inside the gap by rotating the rotor at a predetermined speed; and
   c. providing an edge of the gap at an outer margin of the rotor contact surface for removal of the pulverized particles.

14. The method of claim 13 further comprising the step of passing the material through a screw extruder before the material is conveyed into the gap.

15. The method of claim 14 wherein the material is conveyed into the gap at a material input pressure of near zero such that pulverization of the material within the gap is produced primarily by the shear forces and not by compression forces.

16. The method of claim 15 wherein the material is conveyed into the gap through a material input port formed in a central portion of the dish.

* * * * *